United States Patent

Panaghe

[11] Patent Number: 6,039,238
[45] Date of Patent: Mar. 21, 2000

[54] ELECTRICAL CONNECTION METHOD

[76] Inventor: Stylianos Panaghe, Smith House, Stocks Lane, Over Peover, Knutsford, Cheshire, United Kingdom, WA16 8TW

[21] Appl. No.: 08/849,209
[22] PCT Filed: Nov. 10, 1995
[86] PCT No.: PCT/GB95/02626
§ 371 Date: Sep. 19, 1997
§ 102(e) Date: Sep. 19, 1997
[87] PCT Pub. No.: WO96/17405
PCT Pub. Date: Jun. 6, 1996

[30] Foreign Application Priority Data

Nov. 26, 1994 [GB] United Kingdom .................. 9423921

[51] Int. Cl.⁷ .......................... B23K 20/10; B23K 103/18
[52] U.S. Cl. ................................. 228/110.1; 228/180.21; 228/112.1; 219/541
[58] Field of Search ............................... 228/110.1, 112.1, 228/179.1, 180.21; 29/874–879; 174/261, 250, 251, 94 R; 219/541

[56] References Cited

U.S. PATENT DOCUMENTS

| | | | |
|---|---|---|---|
| 3,650,454 | 3/1972 | Coucoulas | 228/1.1 |
| 3,916,518 | 11/1975 | Jones et al. | 29/629 |
| 4,119,260 | 10/1978 | Stoeckel | 228/111 |
| 5,058,800 | 10/1991 | Yoshizawa et al. | 228/110.1 |
| 5,118,370 | 6/1992 | Ozawa | 228/110.1 |

*Primary Examiner*—Samuel M. Heinrich
*Attorney, Agent, or Firm*—Townsend and Townsend and Crew LLP

[57] ABSTRACT

A method of making an electrical connection stable over a wide temperature range between terminals on a metal or ceramic substrate comprising applying pressure to the connection and ultrasonically welding the terminals together.

6 Claims, 1 Drawing Sheet

ELECTRICAL CONNECTION METHOD

BACKGROUND OF THE INVENTION

1. Field of the Invention

The present invention relates to a method of forming electrical connection and in particular to a method of forming an electrical connection with improved integrity and stability over a wide temperature range.

2. Description of the Prior Art

Various methods of forming electrical connections are known such as soldering, welding or the use of electrically conductive epoxy adhesives.

There are, however, problems in forming a suitable high integrity electrical connection between terminals and a terminal pad which is deposited on a substrate such as metal, steel or ceramic or a substrate comprising one or more metal, steel or ceramic components or layers. Most conventional methods and materials used for attaching terminals have an upper temperature limit beyond which the original characteristics no longer hold so that electrical connections so formed are incapable of maintaining their attachment integrity over a wide temperature range.

All known prior art methods of attaching terminals to terminal pads printed on substrates give electrical connections with limited integrity specifically as it approaches its upper operating temperature.

Such known methods include:

i) solder which is effective up to 200° C. and in any case is time consuming ii) the use of silver loaded epoxy is effective up to 250° C. but is expensive and time consuming iii) the use of glass loaded epoxy which extends the temperature range up to 400° C. but is very expensive and time consuming iv) spring loaded contacts which are at best useful up to 300° C. are very complicated, time consuming and have a limited operating life; in addition the integrity reduces with age v) conventional methods of welding such as an electric arc or flame-burner welding, but these are not technically appropriate for terminal pads on a ceramic or ceramic based or coated substrate.

The present invention has been made from a consideration of these problem.

SUMMARY OF THE INVENTION

According to the present invention, there is provided a method of securing a first terminal to a second terminal or to a terminal pad on a ceramic or metal substrate comprising holding the first terminal on the second terminal or terminal pad and applying friction at high frequency to the terminal and terminal pad to join said terminal and terminal pad together.

The connection of a terminal, for example, of copper, silver or alloys thereof to a terminal pad by the simultaneous application of pressure and high frequency friction is a known technique. However, this technique has not hitherto been applied to the connection of terminals to pads on a ceramic or metal substrate for use at high temperature.

Thus, using the method of the invention, an electrical connection can be formed which is capable of passing electrical current to heating elements that are deposited on metal and/or ceramic substrates using thick film techniques.

The method of the invention can be used, for example, for making connections to terminal pads for heating elements, the pads being printed on a ceramic/metal base The electrical connections thereby formed have been shown to function satisfactorily at both low temperatures such as room temperature and high temperatures above 700° C. Further additional integrity and reliability can be achieved by making multiple contacts simultaneously to the same terminal pad. Statistically this gives added mechanical and electrical security against a percentage of connecting terminals becoming loose or detached for one reason or another.

Preferably, the friction at high frequency is achieved by means of ultrasound. It has been found that an electrical connection formed using the method of the invention has good mechanical and electrical integrity over a wide range of temperatures.

The present invention can be used for the attachment of electrical terminals of various composition and construction to terminals or terminal pads of various differing materials and/or construction on substrates including metal, steel and/or ceramic.

One of the terminals may comprise an electrical heating element or other associated passive or active component provided on the metal or steel substrates. The method provides good mechanical and electrical attachment that can tolerate both low and high temperatures and preferably the terminal means will have sufficient geometrical dimensions to carry the required electrical current.

The first terminal and the second terminal or terminal pad way be of substantially the same material or of different materials.

The electrical connection formed by the invention is preferably one which can tolerate temperatures up to or within close range of the melting point of the connection materials.

The pressure applied to the terminals during the method is chosen having regard to the pad thickness and pad material used, the material construction of the connecting terminals, and/or the cross sectional area of the actual connection. Typically, for some materials, such as alloys, the pressure may be in the region of 170 kN to 240 kN per square meter.

In general, the thickness of the connecting terminal should preferably be substantially equal to the thickness of the pad. The friction frequency is preferably in the range 20 kHz to 40 kHz. Upper and lower maximum temperature limits for which integrity of the connection can be maintained may be 700° C. and −80° C. respectively. It is to be understood that the method of the invention is not confined to producing connections having those upper and lower limits. The pad material can be a single element or a combination of elements such as silver, silver palladium, nickel, platinum, copper or the like. The connecting material can be an element or a combination of the following or proprietary materials such as copper, silver, aluminium copper/nickel alloys and the like.

The invention also provides an electrical connection formed by the method of the invention as defined above.

If desired, an insert preferably of a metal or ceramic that is softer than the terminal and the substrate can be deposited between the terminal and the substrate.

With all the other prior art methods of attachment, there is no way of protecting the area of connection, that is, the area around the termination pad. With the present invention, because of the high temperature tolerance of the attachment, it is possible to cover the termination area with a material such as glass or ceramic, thus providing electrical insulation and mechanical strength.

DETAILED DESCRIPTION OF THE PREFERRED EXEMPLARY EMBODIMENTS

Figure 1:
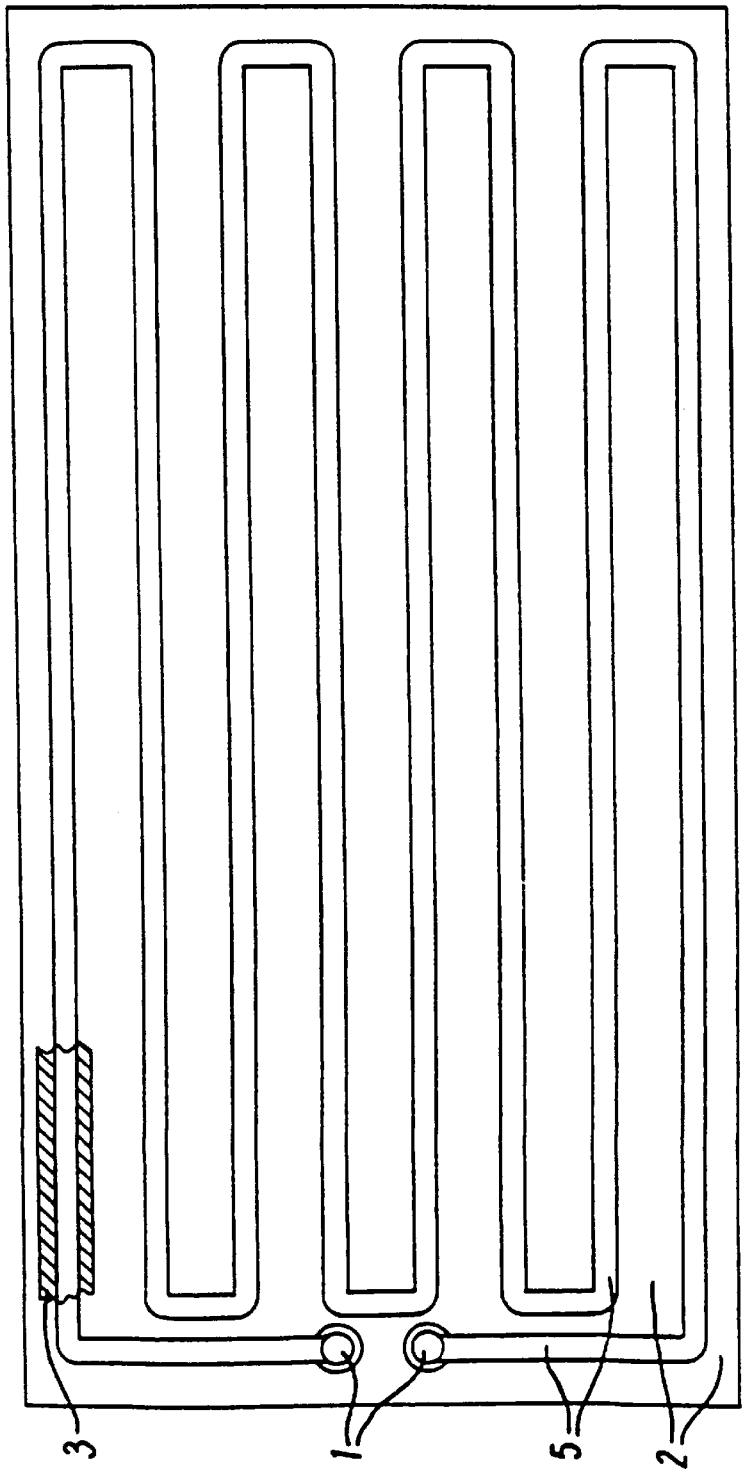
FIG. 1 is a diagrammatic representation of a toaster plate.
Figure 2:
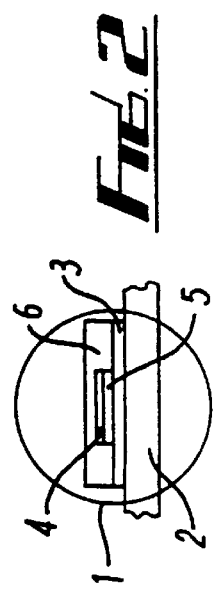
FIG. 2 is a section on an enlarged scale through a terminal pad of the toaster plate of FIG. 1.

Referring to the drawing a ceramic track 3, only a part of which is shown in FIG. 1, is printed on a steel substrate 2. A heater track 5 is printed on the ceramic track 3. The heater track is, as shown, narrower than the ceramic track. The ceramic track 3 is only necessary if electrical insulation is needed between the heater track and the external environment for the purposes of protection both for the user and the heater track. The heater track terminates in pads 1 to which terminals 4 are connected by the application of pressure and ultrasonic welding at preferably 20 to 40 kHz. The termination can be protected by ceramic cover 6 if desired. If desired, a temperature sensor (not shown) can also be included with the heater on the substrate. The sensor is provided with pads to which connection can be made by the method of the invention in order to obtain the data provided by the sensor.

The method of the present invention can provide an electrical connection to a terminal or pad on a substrate in about 5 seconds and, in many cases, a much shorter time. This represents a very considerable saving in time over prior art methods of electrical connector. In addition, connection by soldering required much greater power than the method of the present invention and a higher investment in tooling together with the provision of consumable products.

It will be appreciated that the present invention is not restricted to the details of the above specific embodiment and many variations and modifications can be made.

I claim:

1. A method of securing a first terminal to one of a second terminal or a terminal pad on a heater track on a ceramic or metal substrate, the method comprising:

providing the heater track on a ceramic or metal substrate;

providing the second terminal or terminal pad on the ceramic or metal substrate;

holding the first terminal on the second terminal or terminal pad; and applying friction at high frequency to the terminal and terminal pad to join the terminal and terminal pad together.

2. A method as claimed in claim 1, wherein the first terminal is of the same or similar material as the second terminal or terminal pad.

3. A method as claimed in claim 1, wherein the first terminal is of a different material than the second terminal or terminal pad.

4. A method as claimed in claim 1, wherein the connection between the first terminal and the second terminal or terminal pad is stable up to the melting point of the material of the first terminal and of the second terminal or terminal pad.

5. A method as claimed in claim 1, wherein the high frequency friction comprises ultrasonic welding in a range of 20 to 40 kz.

6. A method as claimed in claim 1, wherein a plurality of connections are made substantially simultaneously on the substrate.

* * * * *